UNITED STATES PATENT OFFICE.

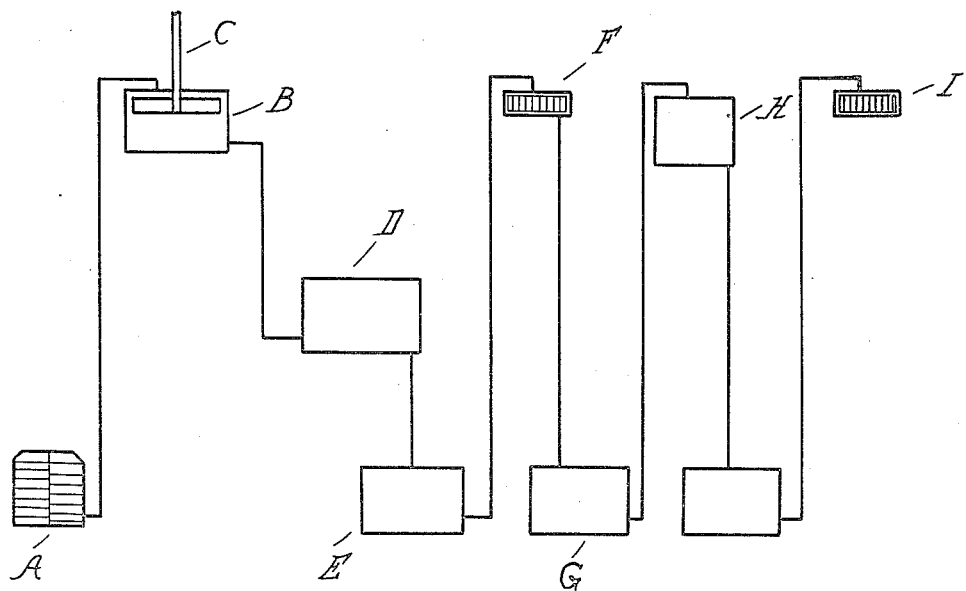

HERMANN WIESE, OF WALLACEBURG, ONTARIO, CANADA.

PROCESS FOR REFINING SUGAR.

1,052,113.  Specification of Letters Patent.  Patented Feb. 4, 1913.

Application filed May 3, 1911. Serial No. 624,849.

*To all whom it may concern:*

Be it known that I, HERMANN WIESE, a subject of the Emperor of Germany, residing at Wallaceburg, in the Province of Ontario and Dominion of Canada, have invented certain new and useful Improvements in Processes for Refining Sugar, of which the following is a specification, reference being had therein to the accompanying drawings.

The invention relates to processes for the refining of raw sugar and is more particularly applicable to the refining of raw cane sugar.

It is the object of the invention to simplify and cheapen the process and particularly by eliminating the necessity of using animal charcoal or bone black.

To this end the invention consists in the novel features as hereinafter set forth.

The drawing represents diagrammatically an apparatus by which my improved process may be carried out.

The raw sugar either with or without previous washing is introduced into a melter A in which it is dissolved and is raised to a temperature preferably about 73° C. and preferably having a density from 18° to 20° Baumé. In this condition the liquid is pumped into a mixing vat B containing a suitable agitator or stirrer C and a quantity of calcium oxid (CaO) or calcium hydrate $Ca(OH)_2$ preferably from three to five per cent. is introduced therein. This is preferably introduced in the shape of milk of lime of 20° Baumé and is thoroughly mixed with the sugar syrup. The liquid is then passed to a tank or vat D in which it is treated with carbonic acid until neutral. At the same time it is heated to raise the temperature to from 85 to 100° C. This heating of the liquid during treatment in the carbonating tank is an important and essential part of my process as without it the decolorization of the juices will not be accomplished and furthermore, filtration is difficult. When however, the temperature is elevated as described, filtration is easily accomplished, removing all mechanical impurities and to a large extent, also decolorizing the juices. Thus the liquid from the carbonating tank D is passed to a receiver E and then to a filter press F from which it passes to a receiving tank G. To complete the decolorization the liquid is subjected to a further lime treatment being passed from the tank G to a tank H in which $1\frac{5}{10}\%$ of lime, preferably in the form of milk of lime, is introduced and then is carbonated to an extent which will show the alkalinity of .02%. It is then heated to a temperature of 90° C. and passed to a filter press I where it is filtered preferably through double cloths. The juice which is now bright and clear is evaporated in any suitable construction of evaporator about 30 to 32 Baumé, and is then preferably but not necessarily, treated with a water solution of sulfurous acid until neutral. The water solution of the sulfurous acid effects a decolorizing which could never be accomplished with treatment of the gas alone. The juices after passing through the treatment above described are 99% pure and can be boiled down to white sugar of any kind.

In my method of treatment of the juices the organic matter and invert sugar (the chief producers of molasses) are eliminated and consequently the raw syrup can be conducted back into the mixing vat without injury, whereby it will be subjected with a newly dissolved cane sugar to the same process of purification, and decolorizing as described. Thus in my process the output of molasses is reduced to the minimum and the highest percentage of sugar is obtained.

While I have described my process as particularly adapted for treatment of cane sugar it may also be applied to refining of raw beet sugar.

A novel feature of my improved process is the manner of decolorizing the solution. The exact nature of the chemical re-action which takes place is not fully understood, but practical demonstration on a large scale has shown conclusively that the dark color solution treated by lime and then by carbonic acid will be clarified. This action may possibly be due to the re-action of the carbonate of lime on the coloring matter and particularly at the comparatively high temperatures to which the solution is subjected.

The essential features of the process are first, that the raw sugar solution is heated and in its heated condition is treated with lime. This results in destroying the glucose or invert sugar as well as destroying organic impurities, second; the solution is carbonized until neutral, third; the carbonated solution is re-heated to a temperature from 70° to 100° C., and fourth; filtered to remove the carbonate of lime and other impurities. The re-heating of the solution after carbonating is very important as I have found in practice that without this re-heating it is impossible to clarify the solution by filtration or even to destroy the coloring matter. When however, the solution is re-heated the coloring matter is to a large extent destroyed and filtration is rendered easy.

What I claim as my invention is:

1. The process of decolorizing and clarifying raw sugar solution which consists in subjecting the hot solution to a treatment with lime, in subsequently carbonating until substantially neutral, in re-heating the solution in the presence of the carbonate of lime and filtering.

2. The process of refining raw sugar which consists in treating a solution at a temperature above 70° C. with lime, in carbonating until substantially neutral, in re-heating to above 80° C. and filtering.

3. The process of decolorizing and clarifying raw sugar solution which consists in first subjecting the heated sugar solution to a treatment with lime, in carbonating until neutral, and re-heating and filtering.

4. The process of decolorizing and clarifying raw sugar solution which consists in first subjecting the heated sugar solution to a treatment with lime, carbonating until neutral, re-heating the solution to a temperature above 70° C. and filtering.

5. The process of decolorizing and clarifying raw sugar which consists in first subjecting the sugar solution heated to a temperature above 70° C. to a treatment with lime, carbonating until neutral, re-heating to a temperature above 70° C. and filtering.

6. The process of decolorizing and clarifying raw sugar which consists in treating a solution at a temperature above 70° C. with lime, in carbonating until substantially neutral, in reheating and filtering.

7. The process of decolorizing and clarifying raw sugar which consists in treating a solution at a temperature above 70° C. with lime, in carbonating until substantially neutral, in reheating to above 80° C. and filtering, in repeating the liming, carbonating until substantially neutral, reheating to above 80° C. and filtering.

8. In a process of decolorizing and clarifying raw sugar solution, the steps which consist in subjecting the hot solution to a treatment of lime to destroy the glucose or invert sugar, in then carbonating until substantially neutral, and in re-heating the solution in the presence of the carbonate of lime before filtration.

9. In a process of decolorizing and clarifying raw sugar solution, the steps which consist in subjecting the solution at a temperature of above 70° C. to a treatment of from 3 to 5% of lime to destroy the glucose or invert sugar, in then carbonating until substantially neutral and in re-heating the solution to above 80° C. in the presence of the carbonate of lime to destroy the coloring matter produced in the destruction of the invert sugar, and in then filtering.

In testimony whereof I affix my signature in presence of two witnesses.

HERMANN WIESE.

Witnesses:
JAMES P. BARRY,
WILLIAM PAGEL.